United States Patent [19]
Cochran

[11] Patent Number: 4,744,703
[45] Date of Patent: May 17, 1988

[54] ROTARY CUTTER FOR SLOTTING OR CUT-OFF

[75] Inventor: Burton L. Cochran, Wooster, Ohio

[73] Assignee: Manchester Tool Company, Akron, Ohio

[21] Appl. No.: 12,827

[22] Filed: Feb. 10, 1987

[51] Int. Cl.$^4$ .............................................. B26D 1/12
[52] U.S. Cl. ........................................ 407/45; 407/46; 407/117; 407/112
[58] Field of Search ............... 407/117, 107, 108, 101, 407/77, 85, 86, 88, 92, 94, 98, 112, 46, 37, 38, 39, 41, 45, 49

[56] References Cited

U.S. PATENT DOCUMENTS

| | | |
|---|---|---|
| 1,073,873 | 9/1913 | Smith . |
| 2,690,610 | 6/1949 | Begle et al. . |
| 3,104,453 | 5/1961 | Greenleaf . |
| 3,200,474 | 8/1965 | Kralowetz .................... 407/46 |
| 3,551,977 | 4/1969 | Novkov . |
| 3,611,525 | 1/1971 | Cochran . |
| 3,643,310 | 2/1972 | Kilbourne et al. . |
| 3,662,445 | 5/1972 | Whitaker .................... 407/117 |
| 3,675,290 | 7/1972 | Mayer . |
| 3,686,729 | 8/1972 | Cochran . |
| 3,758,927 | 9/1973 | Stein . |
| 3,787,941 | 1/1974 | Novkov . |
| 3,791,429 | 2/1974 | Morris . |
| 3,802,042 | 4/1974 | Novkov . |
| 3,805,350 | 4/1974 | Stein . |
| 3,825,981 | 7/1974 | Cochran et al. . |
| 3,846,882 | 11/1974 | Stein . |
| 4,151,869 | 5/1979 | Halloran et al. . |
| 4,181,456 | 1/1980 | Oaks . |
| 4,309,132 | 1/1982 | Adamson et al. . |
| 4,417,833 | 11/1983 | Wertheimer . |
| 4,493,594 | 1/1985 | Okada . |
| 4,533,281 | 8/1985 | Lacey . |
| 4,557,525 | 12/1985 | Merten et al. . |
| 4,566,826 | 1/1986 | Dickinson . |
| 4,583,887 | 4/1986 | Wertheimer . |

FOREIGN PATENT DOCUMENTS 0952298 8/1974 Canada ............................ 407/117

OTHER PUBLICATIONS

Manchester, "The Separator" Catalog Form #376-B.
Manchester Catalog Form No. 319H, 1985.
Manchester "M40" Catalog Form 383A.
Metal Working Production Magazine, May 1983, "Never Mind the Chip Look at the Grip".
Valenite Catalog No. NW-100, Apr. 1983.

Primary Examiner—Frederick R. Schmidt
Assistant Examiner—Lawrence Cruz
Attorney, Agent, or Firm—Watts, Hoffmann, Fisher & Heinke

[57] ABSTRACT

A rotary cutting tool including a cutter body rotatable about a central axis and defining a plurality of recesses opening on a radial and a peripheral surface of the body. Insert support assemblies having portions extending radially from the cutter body are mounted in each recess. Each insert support assembly includes an insert support arm having a mounting portion by which the support arm is mounted to the cutter body and an insert supporting blade portion for supporting an insert a predetermined radial distance beyond the peripheral surface of the cutter body. A clamp member, secured to the cutter body, clamps the insert to the blade portion. A force generating wedge also secured to the cutter body abutably engages a surface on the clamp member and is operative to cause the clamp member to apply a clamping force to the insert. A radial adjustment acting between a wall of the associated recess and a surface on the clamp member adjusts and maintains the radial position of the clamp member. The blade portion of the insert supporting arm has a greater dimension in the peripheral direction and defines a surface that abuts a reaction surface on the cutter body. The engagement between these surfaces resists twisting between the support arm and the cutter body during use.

8 Claims, 3 Drawing Sheets

ROTARY CUTTER FOR SLOTTING OR CUT-OFF

DESCRIPTION

1. Technical Field

The present invention relates generally to metal cutting and in particular to a rotary slotting and cutting tool having replaceable cutting inserts.

2. Background Art

Cutting tools having replaceable cutter inserts are commonly used in industry today. In the case of non-rotating tools, a cutter insert typically constructed of carbide or other material is mounted at the end of a support and is moved toward a rotating workpiece to effect cutting, slotting or other metal working operation.

Rotating cutters are also known and typically comprise a rotatable cutter body which mounts a plurality of replaceable carbide inserts. The inserts include cutting faces that extend beyond a radial or peripheral face of the cutter body. Many if not most of these cutters are used in milling operations to face off or to cut substantial material from the workpiece.

When narrow slots are desired, specialized rotary cutters are normally employed. Usually these cutters resemble rotary saw blades and have an axial dimension approximating the slot dimension. These cutters are available in the form of rotary discs with replaceable inserts. In some, the replaceable inserts are brazed into peripheral slots or other apertures formed in the disc. In other constructions, the inserts are held in the apertures by a key or detent. In at least one construction, a special tool is necessary to remove or replace the inserts.

The overall cutter and especially the cutter inserts are subjected to substantial stresses and forces during a cutting operation. It is believed that with rotary slotting tools, the disc may deflect or bend during the cutting operation causing an imprecise cut. Also, in the event of a malfunction that causes tool breakage, the thin disc body is often damaged and must be replaced along with the inserts. With these types of cutters, replacement and repair can be expensive.

In addition, it is believed that the costs of making these types of tools are significant since the structure for receiving and locking the inserts must be precisely made. Normally, a recess is formed near the periphery of the cutter body which is sized and configured to receive a particular type of insert, and in some constructions, an auxiliary locking key or detent as well. If the insert is changed or modified, the cutter body must usually be changed to accommodate the new insert configuration.

Additional recesses or reliefs are normally formed in the disc for chip control. The recesses or reliefs provide clearance for the chips that are generated during the cutting or slotting operation. These clearance recesses require additional machining steps during manufacture of the cutter and add to its overall cost.

DISCLOSURE OF INVENTION

The present invention provides a new and improved rotary cutter for use in slotting and/or cutoff operations that includes replaceable cutter inserts that are supported beyond the periphery of a cutter body. The inserts are easily replaced and changes in the insert do not require changes in the cutter body itself.

In the preferred and illustrated embodiment, the tool includes a cutting body rotatable about a central axis. A plurality of peripherally spaced recesses, each recess being less than the axial thickness of the body, are formed in a radial face and each recess opens on a peripheral surface of the body. A radially extending insert support assembly is secured in each one of the recesses and mounts a replaceable cutter insert. The insert support assembly includes an insert support arm having a mounting portion that is receivable in a recess and an insert-suppporting blade portion that extends beyond the periphery of the cutter body.

The insert is held in the insert support assembly by a clamp that includes a securing portion receivable in the recess and an insert-engaging portion that extends radially beyond the periphery of the body and extends in the plane of the blade portion of the insert support.

A wedge also received within the recess acts between a wall of the recess and a force-receiving surface defined by the clamp and is operative to apply a clamping force to the insert to maintain its position between the support blade portion and the clamp.

With the disclosed construction, cutter inserts can be easily replaced, changed or readjusted. Since the inserts are supported well beyond the periphery of the cutter body, a malfunction in the machine tool or improper operation will normally not damage the cutter wheel but only one or more inserts and/or associated insert support assemblies. Moreover, the cutter body can be substantial in mass thereby minimizing or reducing flexure or deformation without affecting the size of a slot that can be cut in a workpiece. Because the insert support assemblies are spaced apart around, and extend beyond, the periphery of the cutter body, chip control is provided without the need for separately machined chip reliefs.

According to a feature of the invention, the blade portion of the insert support arm is narrower than the mounting portion enabling the cutter assembly to cut narrow slots in the workpiece even though the cutter body itself has an axial dimension substantially larger than the dimension of the slot being cut. To provide added rigidity, the blade portion of the insert support arm is greater in size in the peripheral direction than the mounting portion and forms a surface that abuts the periphery of the cutter body. This construction tends to resist peripheral forces on the insert support arm relative to the cutter body, during a cutting operation. Because the recess in the cutter body is only in one radial face rather than extending through the entire axial width, the supporting assembly seats against and is secured to a large radial surface that effectively resists any twisting of the blade portions from the desired radial plane.

According to another feature of the invention, the insert clamp is slightly movable within the recess to enable the wedge to move the insert clamp towards engagement with the insert support arm and apply a clamping force to an insert held between the blade portion of the arm and the clamp. In the exemplary embodiment, the wedge is moved axially towards the cutter body to exert the clamping force on the insert clamp.

Additional features of the invention will become apparent and a fuller understanding obtained by reading the following detailed description made in connection with the accompanying drawings.

BEST MODE FOR CARRYING OUT INVENTION

Figure 1:
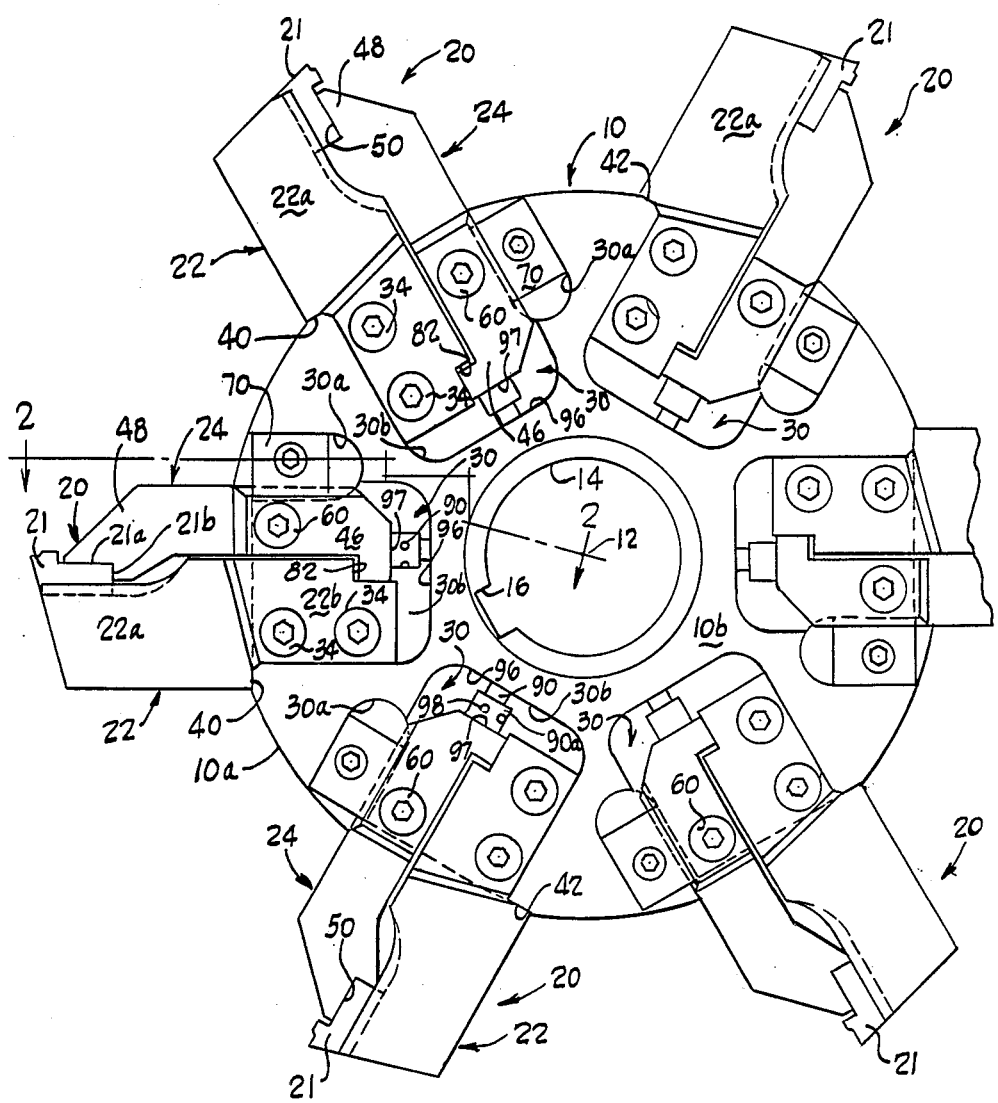
FIG. 1 is a side elevational view of a rotary cutting tool embodying the present invention.

FIG. 1 illustrates the overall construction of a rotary cutter embodying the present invention. The disclosed cutter is especially useful for slotting and cutoff operations.

The rotary cutter includes a cutter body 10 rotatable about a central axis 12. The cutter is mountable to a driven shaft (not shown) forming part of a machine tool (also not shown) and includes a throughbore 14 for receiving the shaft and a keyway 16 for engaging a key (not shown) by which the cutter body 10 is rotatably locked to the shaft.

The cutter body 10 mounts a plurality of insert support assemblies 20 which each mount a replaceable cutter insert 21. The cutter insert 21 is supported at a position spaced radially outward from a periphery 10a of the cutter body.

Each insert support assembly 20 includes an insert support arm 22 that receives and supports the insert, and a clamp 24, which clamps the insert 21 and maintains its position on the support arm 22.

The cutter wheel 10 defines a plurality of recesses 30 which open on a radial face 10b of the cutter body 10 and onto the peripheral surface 10a. Each recess 30 includes a wedge-receiving portion 30a and support arm-receiving portion 30b.

The insert support arm 22 includes a blade portion 22a which extends beyond the periphery 10a of the cutter body 10, and a mounting portion 22b that is secured to the cutter body 10 by fasteners 34. Preferably, the mounting portion 22b has a greater transverse (thickness) dimension than the blade portion 22a to provide added mounting rigidity and strength. In the illustrated embodiment, the fasteners comprise threaded socket head screws which extend through apertures formed in the mounting portion 22b and are threadedly received in bores 36 (shown in FIG. 3) formed in the cutter body 10.

Figure 2:
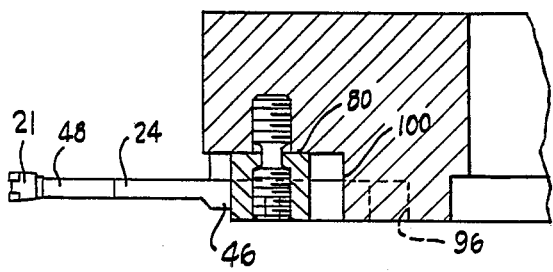
FIG. 2 is a fragmentary, sectional view of the cutter as seen from the plane indicated by the line 2—2 in FIG. 1.
Figure 3:
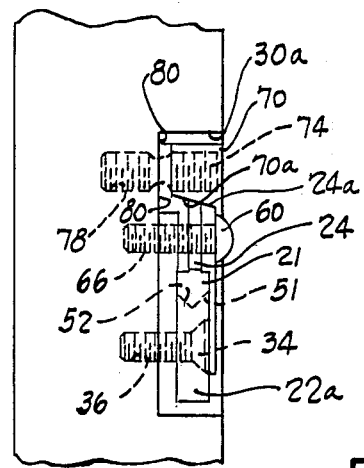
FIG. 3 is an fragmentary end view of the cutter.
Figure 4:
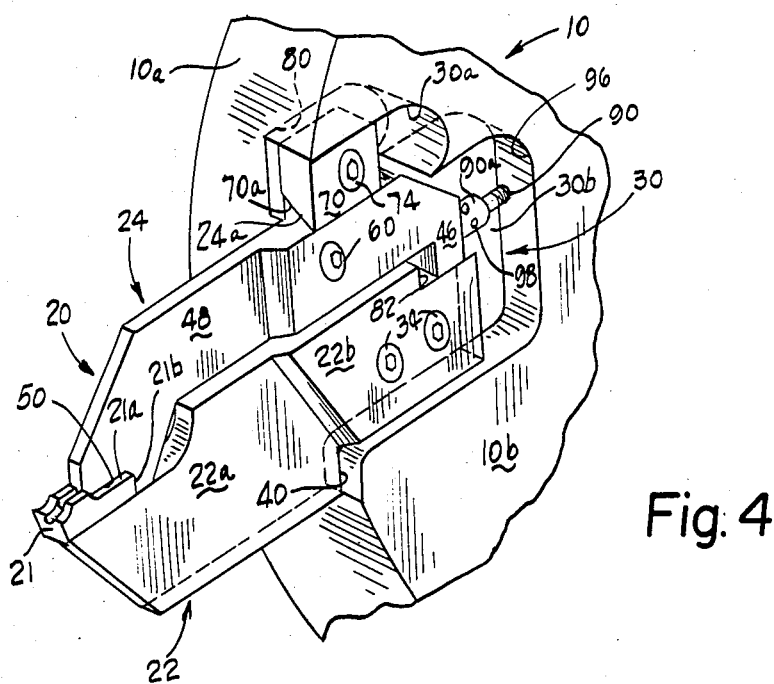
FIG. 4 is a fragmentary perspective view of the cutter.

As seen in FIGS. 2, 3 and 4, the axial dimension, i.e., thickness, of the blade portion 22a is slightly less than that of the insert 21. The reduced axial dimension of the blade portion 22a provides clearance for the blade portion during a cutting operation.

In the preferred embodiment, the cordal dimension of the blade portion 22a is larger than the mounting portion 22b. The increased dimension provides a flat reaction surface 40, which overhangs the recess and abuts a flat surface 42 formed on the periphery 10a of the cutter wheel adjacent the recess. This construction provides added strength for the insert support arm 22 and effectively resists peripherally-directed forces on the blade portion that tend to rotate or move the support arm relative to the cutter body 10 during a cutting operation.

The insert 21 is held at the distal end of the blade portion 22a of the insert support arm 22 by the clamp 24. The clamp 24 has a heel 46 on an inner end and a toe 48 on its outer end. The toe 48 engages and clamps the insert 21 against the blade portion. As seen in FIGS. 1 and 4, the toe 48 defines an L-shaped engagement surface 50 that engages both a top surface 21a and a rear end face 21b to securely mount the insert and inhibit inward radial movement of the insert 21.

In the illustrated embodiment, and as best seen in FIG. 3, the insert 22 includes a V-shaped surface 51 which is received in a complementary formed V-shaped groove 52 defined at the distal end of the insert support arm 22. The clamp 24 is held to the cutter body 10 by a fastener 60 which extends through an aperture in the clamp 24 and is threadedly received by a bore 66 formed in the cutter body 10. The aperture that receives the fastener is slightly larger than the fastener 60 so that slight relative clamping movement between the clamp plate 24 and the fastener 60 is permitted. The heel section 46 of the clamp 24 preferably has a larger transverse dimension than the toe section 48. The thicker heel section stiffens the mounting of the clamp 24 and resists flexure.

The clamping force applied to the insert 21 by the toe portion 48 of the clamp 24 is provided by a wedge 70, which is received in the recess 30a. As seen in FIGS. 3 and 4, the wedge 70 is block-like in construction and includes an inclined surface 70a that engages an inclined top edge surface 24a in the orientation of FIG. 2 of the clamp 24. A socket clamp screw 74 threadedly engages (with opposite-hand threads) both the wedge 70 and a threaded bore 78 in the cutter body 10. Rotation of the stud moves the wedge 70 axially of the body 10 toward and away from a radial wall 80 defined by the recess 30a. As the wedge 70 moves toward the wall 80, a biasing force is applied to the top edge 24a of the clamp 24 and in turn, applies a clamping force upon the insert 21. In particular, as the wedge 70 is tightened, the clamp 24 tends to pivot towards the insert 21 about the foot 46 (which is received by an L-shaped recess 82 defined by the mounting portion 22b of the insert support arm 22).

The radial position of the clamp 24 and hence the insert 21 is determined by a threaded adjustment member 90, which extends from an axial wall 96 and acts between the body and a confronting surface 97 on the inner end 24b of the clamp 24. The member 90 is threaded in the body and acts as a jack screw. Rotation of an adjustment head 90a causes the member 90 to move towards and away from the inner axial wall 96 depending on the direction of rotation. A plurality of radial bores 98 are provided in the adjustment head 90a and are adapted to receive a suitable implement by which the adjustment member is rotated. After the radial position of the clamp 24 is adjusted by manipulation of the adjustment member 90 and after the wedge 70 is tightened to apply a clamping force to the insert 21, the clamp mounting fastener 60 is tightened to secure the clamp to the cutter body 10.

Figure 5:
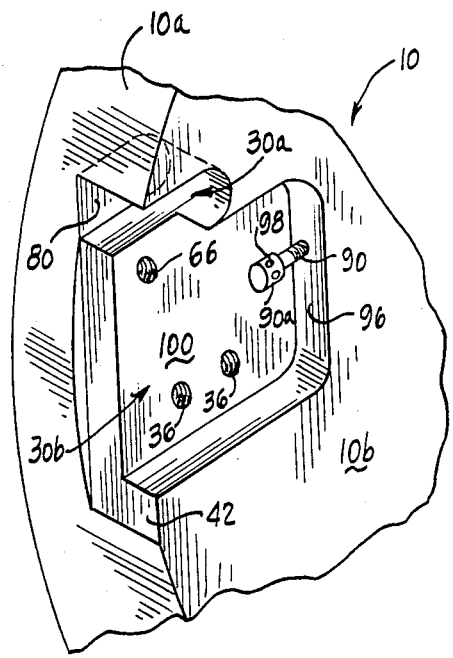
FIG. 5 is a fragmentary, perspective view of a cutter body forming part of the cutting tool shown in FIG. 1.

Turning to FIG. 5, the preferred construction of a recess 30 is illustrated. As indicated above, each recess 30 includes a support arm receiving portion 30b and a wedge receiving portion 30a. In the exemplary embodiment, the support arm receiving portion 30b includes a planar wall 100, against which both the clamp 24 and insert support arm portion 22b abut. When the clamp 24 and support arm 22 are clamped to the surface 100 (by the fasteners 60, 34), a very stable and rigid mounting is provided.

The wedge-receiving recess 30a has a radial dimension that is substantially less than the radial dimension of the recess portion 30b. The recess 30a preferably has a tranverse (or axial dimension) substantially greater than the transverse dimension of the recess 30b. The greater depth of the recess 30a permits substantial axial movement in the wedge 70 relative to the clamp 24 and insures that the outer face of the wedge 70 can be positioned below or flush with, the radial face 10b of the cutter body 10. With the preferred construction, neither the wedge 70 or any of the elements of the insert support assembly extend beyond the radial face 10b of the cutter body 10.

It should be apparent that the present invention provides a new and improved rotary cutter that is convenient to use and easily maintained. Cutter inserts can be easily replaced and adjusted through the manipulation of the fastener 60 (which holds the clamp 24), the wedge 70 and the radial adjustment 90. In addition, should a malfunction in the machine tool occur causing tool breakage, the cutter body 10 itself will normally not be damaged and only one or more of the insert support assemblies 20 need be replaced. The disclosed construction also enables a plurality of the rotary cutters to be ganged on a single shaft so that multiple slots can be simultaneously cut into a workpiece. This is all achieved at reduced manufacturing costs as compared to saw blade-type cutters.

Although the invention has been described with a certain degree of particularity, it should be understood that those skilled in the art can make various changes to it without departing from the spirit or scope of the invention as hereinafter claimed.

I claim:

1. A rotary slot-cutting tool, comprising:
   (a) a cutting body rotatable about a central axis;
   (b) plural recesses, shallower than the axial thickness of the body, peripherally spaced in a radial face and opening through the periphery;
   (c) a radially extending insert support having a mounting portion receivable in one of said recesses and a narrower insert-supporting blade portion extending radially beyond the periphery of the body;
   (d) the blade portion having a greater size in the peripheral direction than the mounting portion at the periphery of the body to form a surface that abuts the periphery;
   (e) a radially extending insert clamp having a securing portion receivable in one of said recesses with the support, and an insert-engaging portion, narrower than the securing portion and no wider than said blade portion, that extends radially beyond the periphery of the body, lies in the plane of and is opposed to the blade portion, said securing portion having a force-receiving surface facing generally away from the insert support;
   (f) a wedge received in said recess, acting between a wall of the recess and said surface, one of said recess wall and surface, as well as an opposed contacting side of said wedge, being inclined in the axial direction of the body;
   (g) means to secure the mounting portion of the insert support in said recess;
   (h) means to secure said securing portion of the insert clamp in said recess while allowing slight movement of the insert clamp within the recess for adjustment;
   (i) an abutment in the recess radially inward from said securing portion of the insert clamp and adjustable radially of the body, and
   (j) means to move said wedge axially of the body.

2. A rotary cutting tool, comprising:
   (a) a cutter body rotatable about a central axis;
   (b) a plurality of insert support assemblies mounted at spaced locations along the periphery of said cutter body and including portions that extend radially beyond said periphery;
   (c) each insert support assembly including:
      (i) an insert support arm having a mounting portion by which said support arm is fixed to said cutter body and an insert support blade extending radially from said periphery of said cutter wheel;
      (ii) said insert support blade defining an insert engaging structure;
      (iii) a clamp member movable towards and away from said insert engaging structure;
      (iv) clamp force generating means engageable with said clamp member and operative to cause said clamp member to apply a clamping force to a cutter insert held between said support blade and said clamp member, said generating means acting between said cutter body and said clamp member;
      (v) securing means for securing said clamp member to said cutter body while allowing slight movement in said clamp member for adjustment;
      (vi) radial adjustment means for adjusting and maintaining a radial position of said clamp member.

3. The apparatus of claim 2 wherein said support blade of said insert support arm has a greater dimension in a peripheral direction than the mounting portion such that a surface is formed that abuts a reaction surface on said cutter body whereby relative twisting between said support arm and said cutter body is resisted.

4. The apparatus of claim 2 wherein said force generating means comprises a wedge block having an inclined surface engageable with said clamp member.

5. The apparatus of claim 2 wherein said support blade has an axial dimension that is less than an axial dimension of said insert.

6. The apparatus of claim 2 wherein said cutter body defines a plurality of recesses spaced peripherally, each of said recesses receiving one of said insert support assemblies.

7. The apparatus of claim 6 wherein said radial adjustment means includes a threaded assembly that acts between a surface defined by said recess and an abutment surface defined by said clamp member.

8. The apparatus of claim 6 wherein said mounting portion of said support arm has a greater axial dimension than the axial dimension of said support blade.

* * * * *